United States Patent
Ogawa et al.

(10) Patent No.: US 7,212,800 B2
(45) Date of Patent: May 1, 2007

(54) DIVERSITY CONTROL METHOD AND WIRELESS COMMUNICATION APPARATUS

(75) Inventors: Takashi Ogawa, Tokyo (JP); Hideya Yamamura, Tokyo (JP); Koji Hika, Tokyo (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 75 days.

(21) Appl. No.: 11/072,385

(22) Filed: Mar. 4, 2005

(65) Prior Publication Data

US 2005/0197086 A1    Sep. 8, 2005

(30) Foreign Application Priority Data

Mar. 5, 2004    (JP)    ............... 2004-062567

(51) Int. Cl.
    *H04B 1/06*    (2006.01)
    *H04B 7/08*    (2006.01)
    *H04M 1/00*    (2006.01)

(52) U.S. Cl. ................. 455/277.1; 455/140; 455/575.7

(58) Field of Classification Search ................. 455/130, 455/132, 133, 134, 135, 136, 550.1, 78, 575.7, 455/279.1, 575.1, 140, 277.1, 272
See application file for complete search history.

(56) References Cited

U.S. PATENT DOCUMENTS

| | | | |
|---|---|---|---|
| 6,052,585 A * | 4/2000 | Homma | 455/426.1 |
| 6,415,141 B1 * | 7/2002 | Kakura et al. | 455/277.1 |
| 6,961,545 B2 * | 11/2005 | Tehrani et al. | 455/101 |
| 2004/0132515 A1 * | 7/2004 | Sunaga | 455/575.7 |
| 2004/0147289 A1 * | 7/2004 | Paljug et al. | 455/562.1 |
| 2004/0170219 A1 * | 9/2004 | Sasaki et al. | 375/148 |
| 2005/0113038 A1 * | 5/2005 | Kasami et al. | 455/101 |
| 2005/0113039 A1 * | 5/2005 | Tsukamoto | 455/101 |
| 2005/0143024 A1 * | 6/2005 | Sung et al. | 455/101 |
| 2005/0176382 A1 * | 8/2005 | Mochizuki et al. | 455/78 |

FOREIGN PATENT DOCUMENTS

JP    2002-237771    8/2003

OTHER PUBLICATIONS

Matsue, H. et al., "802.11 High Speed Wireless LAN Textbook", 2003, 198-199 IDG Japan, ISBN-87280-490-2 (Partial English Translation).

\* cited by examiner

*Primary Examiner*—Sonny Trinh
(74) *Attorney, Agent, or Firm*—Woodcock Washburn LLP

(57) ABSTRACT

A wireless communication apparatus is equipped with a plurality of antennas. A switch leads a received signal by way of an antenna selected according to an antenna switching signal to a demodulator unit. Software installed in a MAC unit generates a first switching signal. A diversity control unit generates a second switching signal by the built-in hardware circuit. The first switching signal is used as an antenna switching signal during a packet receiving ready period, while the second switching signal is used as an antenna switching signal during a period for receiving a packet.

7 Claims, 3 Drawing Sheets

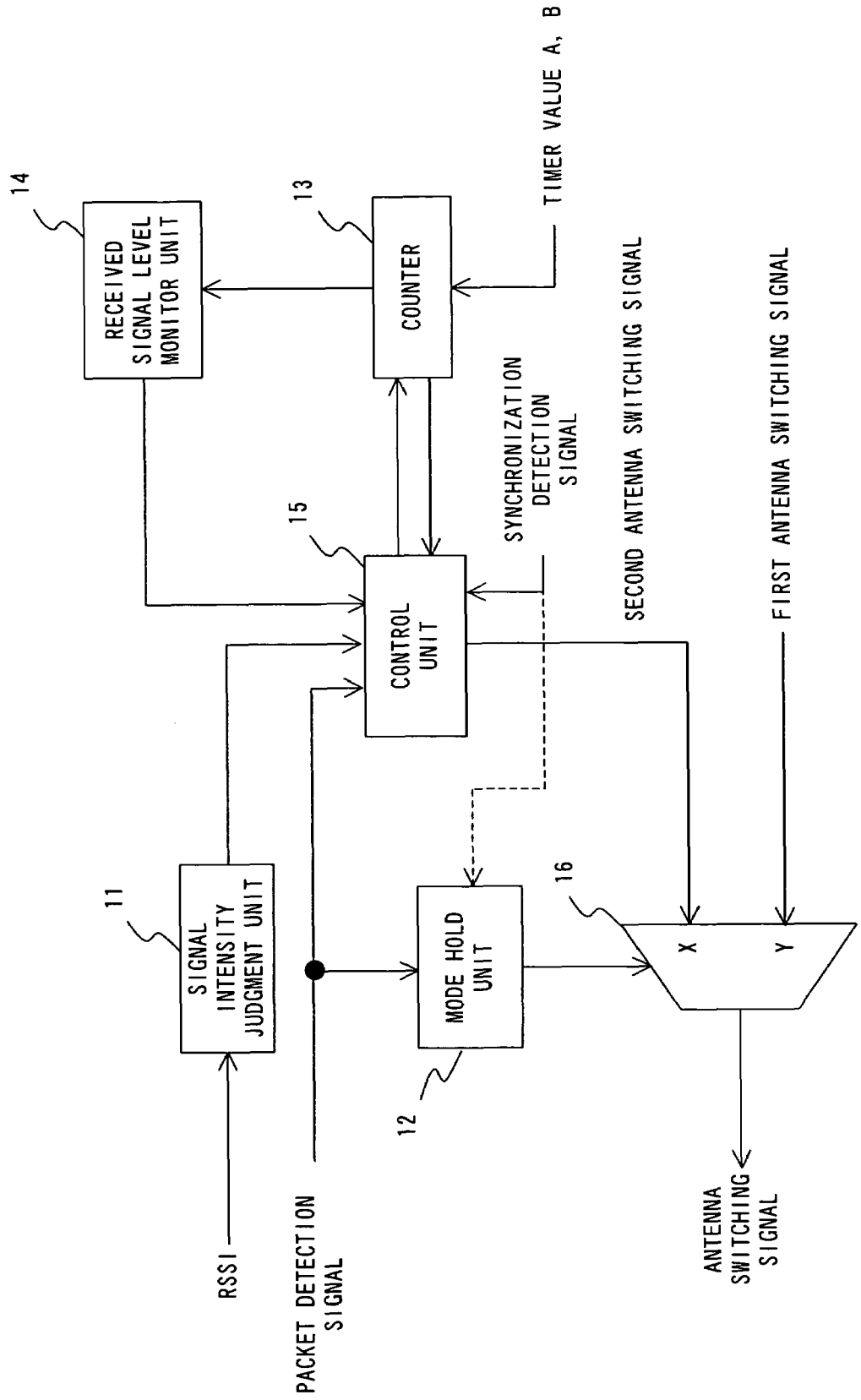
F I G. 3

DIVERSITY CONTROL METHOD AND WIRELESS COMMUNICATION APPARATUS

BACKGROUND OF THE INVENTION

1. Field of the Invention

The present invention relates to a wireless communication apparatus equipped with a plurality of antennas and a method for selecting an antenna in such a wireless communication apparatus.

2. Description of the Related Art

Wireless communication apparatuses are often used in poor communication environments. A diversity technique is developed and utilized to receive signals in such poor environments. Let it be defined here that the diversity technique is for receiving a plurality of signals carrying the same information, selecting an optimal signal from among them, or synchronizing those signals appropriately, thereby improving a receiving characteristic.

One of known configurations as a diversity technique is a method that uses a plurality of antennas for receiving the signals respectively and selecting a signal with the highest received signal level. That is, the method which switches antennas for actual use in response to the received signal level of the respective antennas (e.g., "802.11 Textbook of High Speed Wireless LAN", edited by H. Matsue and M. Morikura, pp. 198–199, Published by IDG Japan, ISBN4-87280-490-2)

Conventional technique for switching antennas for use is a method for generating an antenna switching signal by using software, which generates the antenna switching signal by a processor executing a prescribed program and the antenna switching signal selects an antenna for actual use.

Another conventional technique is a method for generating an antenna switching signal by using a hardware circuit that comprises a counter for counting a switching timing and a series of logic circuits. An antenna for actual use is selected according to the antenna switching signal generated by the hardware circuit.

The method for generating the antenna switching signal by using software has the following problems. That is, since a processor executing the software generating the antenna switching signal usually executes other processing in parallel, it is not possible to assign the processor resource for the antenna switching signal generating process prior to other processing. Besides, a processor used for this purpose is required to be as small and inexpensive as possible. This makes it sometimes hard to perform a processing for detecting a received signal level of each antenna while sequentially selecting one from among the plurality antennas in short time. In addition, since a wireless packet arrives at a random timing, it is difficult to control the switching signal for each packet by a software processing.

The method for generating the antenna switching signal by using a hardware circuit, meanwhile, has the following problem. That is, a wireless communication apparatus detects the received signal levels by sequentially switching the plurality of antennas in relatively long time intervals during a waiting period for arrival of a packet (i.e., standby mode), hence requiring a large counter to count such a long time period and in turn making the circuit size large as a whole.

SUMMARY OF THE INVENTION

The purpose of the present invention is to provide a method and an apparatus capable of selecting an optimal antenna by switching a plurality of antennas in high speed by using a relatively compact circuit.

A diversity control method according to the present invention is for use in a wireless communication apparatus equipped with a plurality of antennas, comprising: performing a standby mode operation to select an antenna to be used according to a first switching signal generated by executing a prescribed program during a packet receiving ready period; and performing a receiving mode operation to select an antenna to be used according to a second switching signal generated by a hardware circuit during a packet receiving period.

In this method, the apparatus waits for packet arrival while switching the antennas in a long interval during a packet receiving ready period. Thus, even software, which is not suitable for high speed processing, can generate a signal for switching the antennas. Once a packet arrives, an antenna to be used must be selected in a short time from a start to receive the packet. Therefore, during a packet receiving period, a signal for selecting an antenna is generated by a hardware circuit which is capable of performing high speed processing.

Alternatively, the operating mode may be changed by judging establishment of synchronization of a received signal. Since there is a low possibility that the synchronization is accidentally established, unnecessary mode changes will be avoided.

In the standby mode, each antenna may be cyclically selected at certain time interval based on the first switching signal. In this method, each antenna will be equally selected.

In the receiving mode, the apparatus may detect a respective received signal level for each of the antennas being cyclically selected by the second switching signal, and select an antenna to receive a packet according to the detection result. This makes it possible to receive a packet by way of an antenna obtaining the optimal received signal level.

Alternatively, in the receiving mode, the apparatus may generate the second switching signal to cyclically select each antenna until a predetermined received signal level is obtained, and select an antenna by which the received signal level is obtained for receiving a packet. In this method, it is not always needed to check the received signal level for all of the antennas. Accordingly, it is possible to reduce processing time for selecting antenna.

According to the present invention, a wireless communication apparatus having a diversity function for selecting an antenna from among a plurality of antennas for receiving a signal comprises: a first generation unit for generating a first switching signal by executing a prescribed program; a second generation unit comprising a hardware circuit for generating a second switching signal; and a selection unit for selecting an antenna according to the first switching signal during a packet receiving ready period, and selecting an antenna according to the second switching signal during a packet receiving period. The operating process of this apparatus is basically the same as the above described diversity control method.

When there is a need to select an antenna for actual use in a short time (that is, when performing the diversity control method in a communication environment where the received signal levels greatly fluctuate over time), a hardware circuit generates a signal for switching the antennas. This prevents a delay in processing for antenna selection from occurring. A counter to count time for antenna switching timing is factually small in size since it counts only a short time, thereby making the circuit compact as a whole.

Since a higher speed processing is enabled by the hardware circuit, a diversity control can be performed for each packet, making a high probability of selecting an antenna with a good received signal level.

The received signal levels are detected by switching antennas in a long time interval during the period where there is no need to select an antenna for actual use in a short time. If a hardware circuit generates an antenna switching signal for such a long time interval, a large size counter would be required. In the present invention, however, since software generates the antenna switching signal during such time, such a large size hardware circuit is not needed.

BRIEF DESCRIPTION OF THE DRAWINGS

FIG. 3 is a block diagram of a diversity control unit.

DESCRIPTION OF THE PREFERRED EMBODIMENTS

Figure 1:
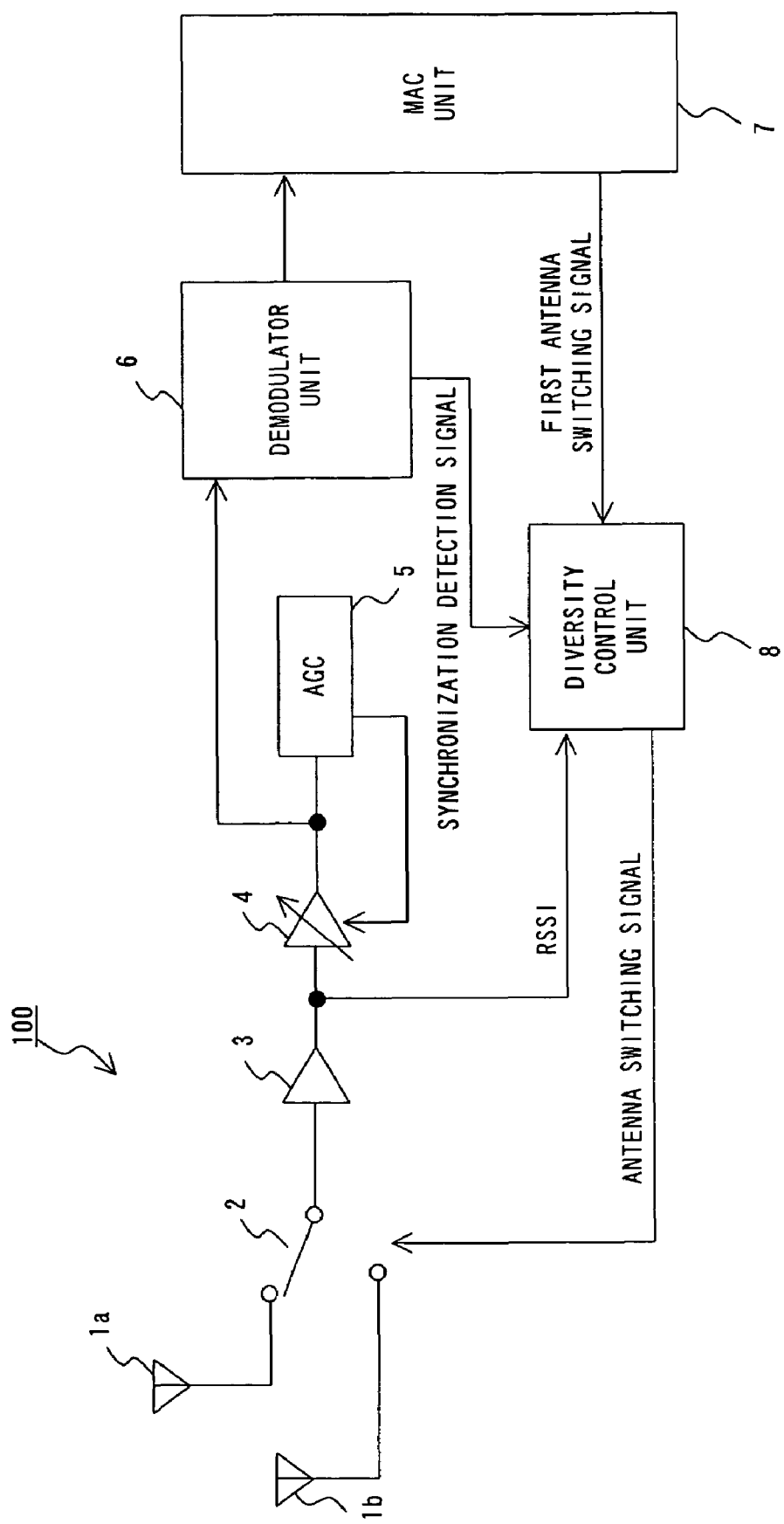
FIG. 1 illustrates a wireless communication apparatus of an embodiment according to the present invention.

FIG. 1 illustrates a wireless communication apparatus of an embodiment according to the present invention. Note that FIG. 1 only depicts a part directly related with the present invention. Let it be defined herein that a wireless communication apparatus 100 shown in FIG. 1 is used for a wireless LAN in accordance with IEEE802.11 standard, while the aforementioned apparatus per se is not generally limited as such. Additionally, the wireless communication apparatus 100 is equipped with a plurality of antennas and has a diversity function for selecting an optimal antenna from among the plurality of antennas in order to receive a signal.

Antennas 1a and 1b respectively receive a wireless signal, and are also used for transmitting a signal. A switch 2 selects either one of the antennas 1a and 1b based on an antenna switching signal generated by a diversity control unit 8 and then leads a received signal by way of the selected antenna to a low noise amplifier 3.

The low noise amplifier 3 amplifies the signal received by way of antennas 1a or 1b. A variable gain amplifier 4 further amplifies the amplified signal by the low noise amplifier 3. An AGC (Automatic Gain Control) circuit 5 adjusts gain of the variable gain amplifier 4 so as to maintain an amplitude or power of the signal being amplified by the variable gain amplifier 4 at a predetermined value.

A demodulator unit 6 demodulates the signal being amplified by the variable gain amplifier 4. The demodulator unit 6 is equipped with a function for monitoring the correlation between a received signal and a predetermined code by using, e.g. a matched filter so that, when a correlation value exceeds a predetermined value, the demodulator unit 6 regards that the predetermined code is synchronized with the received signal. Accordingly the demodulator unit 6 outputs a synchronization detection signal. Let it omit a description of other functions of the demodulator unit 6 herein.

A MAC (Medium Access Control) unit 7 provides functions for establishing a transmission timing in order to avoid a collision of packets, and for managing communications between an access point and a terminal, or between the terminals. The MAC unit 7 also generates a first antenna switching signal for instructing the switch 2 through a diversity control unit 8 to use either antenna 1a or 1b. The MAC unit 7 is equipped with a memory for storing a prescribed program and a processor for executing the program stored in the memory so as to generate the first antenna switching signal. In other words, the software generates the first antenna switching signal. Note that the first generation unit noted in claims herein corresponds to the MAC unit 7 or the above noted memory and processor equipped in the MAC unit 7.

The diversity control unit 8 generates a second antenna switching signal based on RSSI (Received Signal Strength Indicator) and a synchronization detection signal generated by the demodulator unit 6. Here, the function for generating the second antenna switching signal is implemented by a hardware circuit in the diversity control unit 8. That is, the second antenna switching signal is generated by the hardware circuit. The diversity control unit 8 selects either the first or second antenna switching signal and outputs it as an antenna switching signal to the switch 2. Meanwhile, the RSSI is obtained by using an output of the low noise amplifier 3.

In the wireless communication apparatus 100, the diversity control unit 8 selects either the first antenna switching signal generated by the software, or the second antenna switching signal generated by the hardware circuit in the diversity control unit 8, and outputs the selected signal as the antenna switching signal. Then the switch 2 selects either the antenna 1a or 1b in accordance with the antenna switching signal. A signal received by way of the antenna selected based on the antenna switching signal, is led to the demodulator unit 6.

Figure 2:
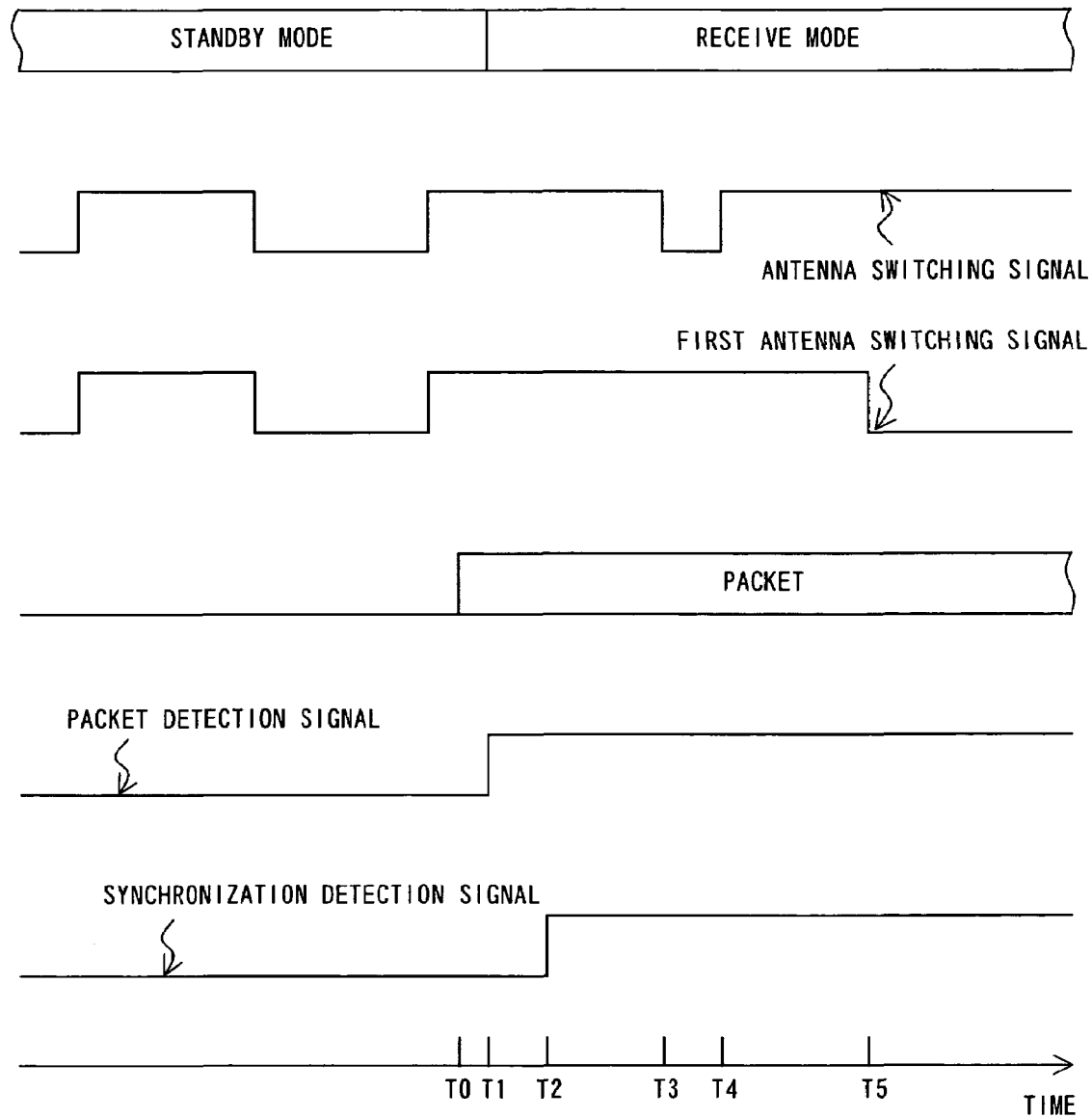
FIG. 2 describes a diversity operation.

FIG. 2 describes a diversity operation. Let it be assumed that the wireless communication apparatus 100 is in the ready state for receiving a packet prior to the time T0, and starts receiving a packet at the time T0.

The MAC unit 7 continuously generates and outputs the first antenna switching signal. The first antenna switching signal is a signal for instructing the switch 2 through the diversity control unit 8 to cyclically select either antenna 1a or 1b at a certain time interval. Let it define that the level High of the first antenna switching signal instructs the switch 2 to select the antenna 1a, while the level Low instructs the switch 2 to select the antenna 1b. In FIG. 2, the time scale is different from the one before the time T0 for an easy viewing of the drawing. Specifically, the time scale before time T0 is compressed in that the actual period of the first antenna switching signal is longer than the period of the first antenna switching signal between times T0 and T5, for instance.

Before the time T0, the wireless communication apparatus 100 is in the ready state for receiving a packet, and operates in the standby mode. In the standby mode, the diversity control unit 8 outputs the first antenna switching signals as antenna switching signals. That is, the antenna 1a or 1b is alternately selected in a certain time interval.

When the head of a packet arrives at the wireless communication apparatus 100 at the time T0, a received signal level becomes high. If the received signal level exceeds a predetermined level, the packet detection signal changes from Low to High (at the time T1), and the operation mode of the wireless communication apparatus 100 is changed from the standby mode to the receiving mode. In the receiving mode, the diversity control unit 8 outputs the second antenna switching signal as an antenna switching signal. At the time the packet detection signal changes from Low to High, the second antenna switching signal maintains its state at the time of the standby mode, that is, maintaining at High (i.e., instructing the switch 2 to select the antenna 1a) in this embodiment. Therefore, the wireless communication apparatus 100 receives the signal by way of the antenna 1a after the time T1.

After the time T1, the demodulator unit 6 monitors the correlation between the received signal and the predetermined code. When the correlation value exceeds a predetermined value (at a the time T2), the synchronization detection signal is changed from Low to High.

Between the time T2 and T3, the received signal levels are monitored based on the output from the variable gain amplifier 4. The received signal levels of the signals received by way of the selected antenna 1a are monitored in this embodiment. Note that the processing for monitoring the received signal levels may be done by, for instance and not limited as such, the diversity control unit 8, the AGC circuit 5 or the demodulator unit 6.

At the time T3, the diversity control unit 8 judges whether or not to switch antenna based on the RSSI, and switches the antennas if needed. Specifically, if the RSSI is lower than a predetermined value, the diversity control unit 8 judges that the received signal level is lower than a satisfactory level, and changes the level of the second antenna switching signal. If the RSSI is larger than the predetermined value, there is no need to compare with the received signal level of the other antenna, because the received signal level is satisfactory. Hence, the level of the second antenna switching signal is maintained. The RSSI is lower than the predetermined level in the example shown in FIG. 2, the second antenna switching signal is changed from High to Low at the time T3. Therefore, the selection of the antenna 1b is maintained until the time T4. That is, the received signal levels of signal received by way of the antenna 1b are monitored between T3 and T4.

If the RSSI is lower than the predetermined level as with the present embodiment, at the time T4, the received signal level of signal received by way of the antenna 1a and that of the antenna 1b are compared, and an antenna with a satisfactory received signal level is determined. The diversity control unit 8 generates the second antenna switching signal for indicating the antenna selected through the aforementioned comparison to output it as the antenna switching signal. The present embodiment shows a case where the received signal level of the signal received by way of the antenna 1a is better. That is, the antenna switching signal is maintained at High after the time T4. The switch 2 selects the antenna 1a, and the signal received by way of the antenna 1a is led to the demodulator unit 6 thereafter.

In the receiving mode, the second antenna switching signal generated by the hardware circuit takes precedence over the first antenna switching signals. For instance, although the first antenna switching signal is changed from High to Low at the time T5, the antenna switching signal output from the diversity control unit 8 is not affected by the change in the first antenna switching in the example shown in FIG. 2.

FIG. 3 is a block diagram of the diversity control unit 8. A signal intensity judgment unit 11 judges a necessity of switching antennas based on an RSSI. Specifically, the signal intensity judgment unit 11 judges the received signal level is not satisfactory if the RSSI is lower than the predetermined level, and sends a signal for changing a level of the second antenna switching signal to a later described control unit 15; whereas sends a signal for maintaining the second antenna switching signal to the control unit 15 if the RSSI is higher than the predetermined level because there is no need to compare with the received signal level of the other antenna.

A mode hold unit 12 holds information for indicating an operation mode of the wireless communication apparatus 100 based on a packet detection signal. In this embodiment, the information for indicating the standby mode is held when the packet detection signal is Low, while the information for indicating the receiving mode is held when the packet detection signal is High.

A counter 13 has a timer value "A" for specifying the period between T2 and T3; and a timer value "B" for the period between T2 and T4. The counter 13 is started by the synchronization detection signal changing from Low to High, and generates respective pulses at the timings of "time-up" of the timer values A and B, respectively. These pulse signals are sent to a received signal level monitor unit 14 and the control unit 15.

The received signal level monitor unit 14 monitors the received signal levels during the period between T2 and T3 based on the output from the variable gain amplifier 4. If the diversity control unit 8 judges the received signal levels being unsatisfactory (i.e., the RSSI is lower than the predetermined level), the received signal level monitor unit 14 continues to monitor the received signal level during the period between T3 and T4.

The control unit 15 generates the second antenna switching signal through the following operations:

(1) The control unit 15 sets the second antenna switching signal at High, when the packet detection signal is changed from Low to High (at the time T1).

(2) The signal intensity judgment unit 11 judges a necessity of switching the antennas based on the RSSI, when the counter 13 is time-up for the timer value "A" (at the time T3). If the RSSI is higher than the predetermined value, the level of the second antenna switching signal is maintained; while if the RSSI is lower than the predetermined value, the level of the second antenna switching signal is changed. The second antenna switching signal is changed from High to Low in the present embodiment.

(3) If the RSSI is lower than the predetermined level, the second antenna switching signal is set for selecting the antenna to obtain the optimal received signal level based on the comparison result between the received signals of the antennas 1a and 1b monitored at the received signal level monitor unit 14, when the counter is time-up for the timer value "B" (at the time T4).

A selector 16 selects the first antenna switching signal when the mode hold unit 12 holds the information for indicating the standby mode, while it selects the second antenna switching signal when the mode hold unit 12 holds the information for indicating the receiving mode. An output of the selector 16 is given to the switch 2 shown in FIG. 1 as the antenna switching signal.

This diversity control unit 8 (including at least the mode hold unit 12, counter 13, control unit 15 and selector 16) is implemented by a hardware circuit. That is, the second antenna switching signal is generated by the hardware circuit. Therefore, it is possible to satisfy a requirement a communication standard to be in compliance with even if a very short time is specified, for the period between the time of the head of a packet arriving (at the time T0 in FIG. 2) at the wireless communication apparatus 100 and that of selecting an antenna for receiving the packet (at the time T4 in FIG. 2).

Note that the second generation unit described in claims herein is achieved by the counter 13 and the control unit 15 for instance, and the selection unit is achieved by the switch 2, the mode hold unit 12 and the selector 16 for instance.

Meanwhile, the packet receive ready period is specified for a relatively long time period, in which an antenna switching signal is to be switched, by the communication standards for compliance. Therefore a software-generated first antenna switching signal may be used for the antenna switching signal without causing a delay.

Furthermore, if an antenna switching signal for such a relatively long period of time as noted above is generated using a hardware circuit, a large counter is needed and circuit size becomes large as a whole. The wireless communication apparatus 100 of the present embodiment does not need such a large circuit since the software-generated signal is used as the first antenna switching signal for switching antennas during the packet receive ready period.

Note that, while the above described embodiment changes the operation mode of the wireless communication apparatus 100 from the standby mode to the receiving mode at the time a packet detection signal is changed from Low to High, the present invention is not limited as such. The operation mode may be changed when the synchronization detection signal is changed from Low to High. In that case, a detection accuracy of the synchronization detection signal is higher than that of the packet detection signal. Therefore, in using this method, it is possible to switch the operation mode to the receiving mode with a higher certainty and also eliminate an extraneous mode switching because the mode switching is done only when a packet arrives at the wireless communication apparatus 100, unlike the above described embodiment in which a mode switching is done when the received signal level merely becomes high even if a packet has not arrived thereat.

Meanwhile, a mode switching may be performed by monitoring both the packet detection signal and the synchronization detection signal. In this case, a packet detection signal is used for the mode switching, in addition, the synchronization detection signal is used for the mode switching even if the packet detection signal is not generated.

Meanwhile, various alternative configurations may be contrived depending on the usage environment of the wireless communication apparatus in the above described embodiment, such as a control method for generating the antenna switching signal by a hardware circuit only or a software only, or for giving higher priority to the signal generated by a software circuit than the signal generated by a hardware circuit. For instance, a judgment for selecting an antenna may be conducted for every few packets for a communication environment with a small fluctuation of the received signal level over time, instead of generating the switching signal by a hardware circuit for every packet, thereby suppressing the power consumption by a reduced frequency of switching antennas.

Furthermore, while the wireless communication apparatus 100 is equipped with two antennas in the above described embodiment, the present invention is applicable to a wireless communication apparatus equipped with three or more antennas.

Yet furthermore, while the above described embodiment is relating to a wireless communication apparatus used for a wireless LAN (in accordance with IEEE802.11, especially), the present invention is applicable to other types of wireless communication apparatuses.

What is claimed is:

1. A diversity control method for use in a wireless communication apparatus equipped with a plurality of antennas, comprising:
    performing a standby mode operation to select an antenna to be used according to a first switching signal generated by executing a prescribed program during a packet receiving ready period; and
    performing a receiving mode operation to select an antenna to be used according to a second switching signal generated by a hardware circuit during a packet receiving period.

2. A diversity control method for use in a wireless communication apparatus equipped with a plurality of antennas, comprising:
    performing a standby mode operation to select an antenna to be used according to a first switching signal generated by executing a prescribed program during a time period in which a synchronization of a received signal is not established; and
    performing a receiving mode operation to select an antenna to be used according to a second switching signal generated by a hardware circuit during a time period in which a synchronism of a received signal is established.

3. The diversity control method according to claim 1, wherein
    each antenna is cyclically selected at a certain time interval by the first switching signal during the standby mode operation.

4. The diversity control method according to claim 1, further comprising in the receiving mode operation,
    detecting a respective received signal level for each antenna being cyclically selected by the second switching signal, and
    selecting an antenna to receive a packet according to the detection result.

5. The diversity control method according to claim 1, further comprising in the receiving mode operation,
    generating the second switching signal to cyclically select each antenna until a predetermined received signal level is obtained, and
    selecting an antenna by which the predetermined received signal level is obtained for receiving a packet.

6. A wireless communication apparatus having a diversity function for selecting an antenna from among a plurality of antennas for receiving a signal, comprising:
    a first generation unit for generating a first switching signal by executing a prescribed program;
    a second generation unit, comprising a hardware circuit, for generating a second switching signal; and
    a selection unit for selecting an antenna according to the first switching signal during a packet receiving ready period, and selecting an antenna according to the second switching signal during a packet receiving period.

7. A wireless communication apparatus having a diversity function for selecting an antenna from among a plurality of antennas for receiving a signal, comprising:
    a first generation unit for generating a first switching signal by executing a prescribed program;
    a second generation unit, comprising a hardware circuit, for generating a second switching signal; and
    a selection unit for selecting an antenna according to the first switching signal during a time period in which a synchronization of a received signal is not established, and selecting an antenna according to the second switching signal during a time period in which a synchronization of a received signal is established.

* * * * *